United States Patent Office 3,467,175
Patented Sept. 16, 1969

3,467,175
INFRARED DETECTING DEVICE
Ward F. O'Connor, Denville, N.J., assignor to The Lummus Company, New York, N.Y., a corporation of Delaware
Filed Mar. 24, 1967, Ser. No. 625,739
Int. Cl. F28f 27/00; G05d 23/00; F23n 1/00
U.S. Cl. 165—11                        7 Claims

ABSTRACT OF THE DISCLOSURE

This disclosure concerns an apparatus for measuring the temperature of an object, fluid or a fluid within a container, by measuring the radiation emission from the object, fluid, or fluid holding container. A high degree of accuracy is achieved and the problems ordinarily found because of high temperature and/or physically hostile environments are avoided by encasing the line of sight of the pyrometer in a suitable tube. The apparatus is suitable for use in heat exchange devices as well as in ordinary piping systems. Further, the output of the apparatus is suitable as an input for an automatic control system or the like.

BACKGROUND OF THE INVENTION

Devising suitable means for sensing temperatures of bodies or fluids has become an increasingly difficult problem. As the development of high temperature alloys and combustion methods have allowed increased process temperatures to be achieved, known temperature sensing devices have been found to be inadequate for many purposes.

Among the many known devices which have been used are thermocouples and pyrometers. Thermocouples are ordinarily used in the process apparatus, mounted within a projection tube or well which is installed so as to project into a medium, the temperature of which is to be sensed. Pyrometers, on the other hand, have been used in applications such as furnaces wherein a sight can be had on the combustion through a sighting hole.

Neither thermocouples nor pyrometers have been satisfactory for many of the environments in which they have been used. For example, when thermocouples are mounted for use in furnaces or in other structures wherein the environment can be described as being hostile both chemically and thermally, the tubes or wells in which they are mounted must be of a material which can withstand attack by the environmental gases and endure the environmental temperatures. Further, the thermocouple must extend into the environment sufficiently far to avoid erroneous readings through conduction along the well from the wall on which it is mounted. It is often found, however, that a thermocouple even properly mounted undergoes thermoelectric decay causing progressively more erroneous readings with the passage of time.

Thermocouples have also been mounted in wells which extend into the path of a fluid flowing through a pipe or tube when it is desired to sense the temperature of the flowing fluid. Obviously, this approach has the distinct disadvantage of disrupting and restricting flow in the pipe or tube as well as the problem of erosion as to the well.

Pyrometers, while they have avoided the problems incidental to being exposed to hostile environment in that they are mounted externally to the reaction chamber, have been limited as to their utility. By reason of their usual external mounting, they have been of no use for accurately measuring temperature of particular bodies internally mounted or of media within bodies mounted internally in that they are unable to discriminate environmental radiation from the radiation of the body to be sensed.

An example of an apparatus in which temperature sensing has heretofore been exceedingly difficult is a high temperature heat exchanger, particularly the short residence time heat exchanger, wherein temperatures encountered are in the range of and above 1,000° F. Very often it is desired to sense the temperature of reactants which are flowing within the process tubes of such a heat exchanger, in that the sensed values may be used to control the process or for purposes of triggering safety alarm systems or the like. However, since the reactant containing tubes are within the heat envelope of the exchanger, a thermocouple will probably be inadequate as discussed above. Similarly, known applications of pyrometers would be inadequate because of the difficulty in getting a satisfactory, unobstructed line of sight on the process tubes.

SUMMARY

In view of these problems and other well known to those having skill in the art, it is an object of the present invention to provide an apparatus for sensing the temperature of a body where the body is mounted in a hostile environment.

Another object of the present invention is the provision of an apparatus for sensing the temperature of a fluid in a body, which apparatus has no parts protruding into the fluid containing body.

A still further object of the present invention is the provision of an apparatus for sensing the temperature of fluid in a high temperature environment heat transfer line, the output of which apparatus can be used for analog measurement of temperature and analog or digital control in an automated process.

These and other objects are achieved by the present invention wherein there is provided a radiation sensing device in line of sight with, but removed from a body emitting radiation to be sensed, and an isolating means for surrounding the sight path between the radiation sensing device and an exposed surface of the emitting body.

THE DRAWING

A more complete understanding of the present invention with its many attendant advantages may be had by reference to the following detailed description thereof when considered in connection with the accompanying drawings in which like reference numerals designate like parts and wherein.

DESCRIPTION OF PREFERRED EMBODIMENTS

Figure 1:
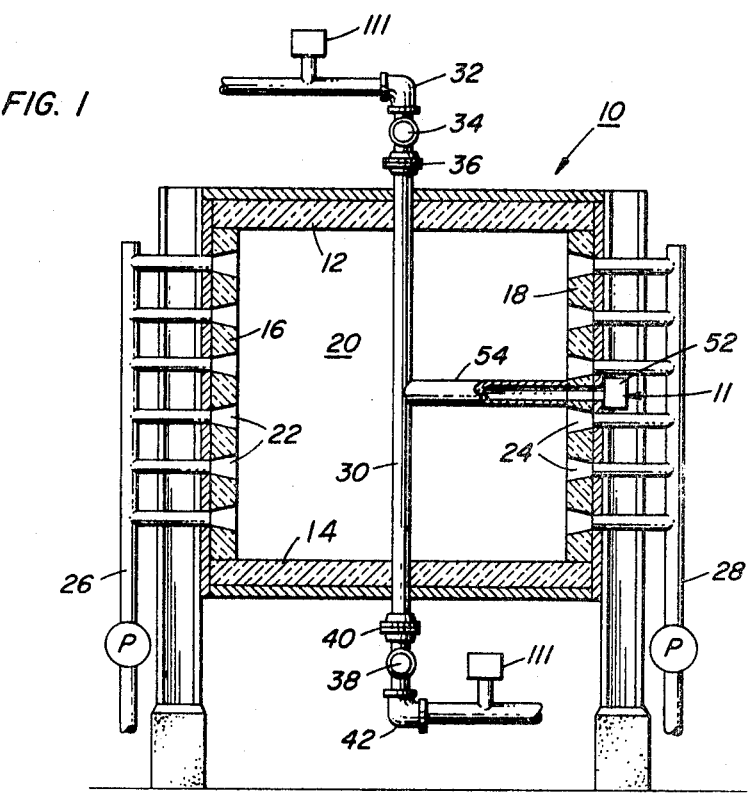
FIG. 1 is a cross-sectional elevational view of a process heater utilizing temperature sensing apparatus according to the present invention.

Referring to FIG. 1, there is seen a process heater, generally designated by the reference numeral 10, having temperature sensing apparatus 11 and 111 according to the present invention, in use therewith. The process heater 10, with respect to which the present invention is disclosed, is the type known as a steam reformer, however, it is to be recognized that the temperature sensing device according to this invention may be used in substantially any environment where thermal conditions are to be sensed. Process heater 10 is rectangular in shape, having a top wall 12, a bottom wall 14, and side walls 16 and 18 which define a refractory-lined heating chamber 20. The side walls 16 and 18 have burners 22 and 24 mounted therein and extending the length and width thereof. The burners 22 and 24 are supplied with fuel through conduits 26 and 28 respectively, the fuel flow being controlled by suitable metering valves (not shown).

Vertically extending process tubes 30 are positioned in the center of chamber 20, equidistant from side walls 16 and 18. Process tubes 30 are supplied with a reactant mixture through an inlet pipe 32. The inlet pipe 32 feeds a common manifold 34 which distributes the reactants to all of the tubes 30. After the reactants have passed through the tubes 30, the reaction products are removed through a manifold 38 which is coupled to the tube 30 and to an outlet pipe 42.

As can be seen in FIG. 1, temperature sensing apparatus 11, 111 according to the present invention are provided to sense the temperature of reactants in inlet pipe 32, the reaction in process tube 30, and the reaction products in outlet pipe 42. It is to be understood, however, that as many or as few of the sensing apparatus may be utilized as are required depending entirely upon the degree of control or amount of information necessary for the process operations.

Figure 2:
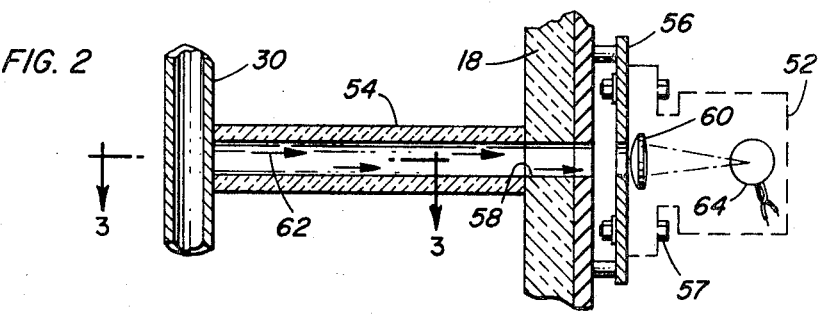
FIG. 2 is a front elevational view, partly in section of the temperature sensing apparatus designated as 11 in FIG. 1.
Figure 3:
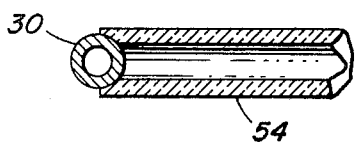
FIG. 3 is a cross-sectional view, through the plane 3—3 of FIG. 2.

Referring now to FIG. 2 it can be seen that a temperature sensing apparatus for sensing the temperature of a reaction in a process tube 30 in the heating chamber 20 of process heater 10 comprises broadly a "total radiation" pyrometer 52 and a radiation isolation tube 54. "Total radiation" pyrometers are those which occupy a position in temperature measurement equivalent to that of iron-constantan or Chromel-Alumel thermocouples. The successful sensing of temperatures by this apparatus depends upon the capability of the pyrometer 52 to receive radiation 62 from the surface of process tube 30 and the exclusion of all other radiation which might render the sensed radiation value inaccurate. To this end, radiation isolation tube 54, which comprises a pipe-like tube of insulating material, extends horizontally between vertical process tube 30 and an opening 58 in side wall 18. As can be best seen in FIG. 3, isolation tube 54 is contoured at its process tube adjacent end to conform to the outer surface of process tube 30 thereby enabling firm abutting engagement between the isolation tube 54 and the process tube 30. As its wall adjacent end, isolation tube 54 abuts the inner surface of wall 18, the longitudinal axis of tube 54 in the preferred embodiment being perpendicular to wall 18 and coaxial with the axis of opening 58.

Pyrometer 52 is mounted on a mounting plate 56 which is secured to the external surface of side wall 18 such as by welding. Bolt holes are provided in mounting plate 56 and positioned so that when pyrometer 52 is secured to the plate 56 by bolts 57, the focussing lens 60 of the pyrometer 52 will be coaxial with the longitudinal axis of isolation tube 54, opening 58 in side wall 18 and a coaxial opening in plate 56. Thus, the radiation detecting means of the pyrometer is sighted directly at the surface of process tube 30 through plate 56, wall 18 and isolation tube 54. In this manner, the radiation 62 emitted from the surface of process tube 30 within tube 54 is passed through tube 54, wall 18 and focussing lens 60 into the bolometer 64 of pyrometer 52. The tube 54 prevents environmental radiation from joining the process tube radiation thereby insuring that the radiation sensed by the pyrometer is truly indicative of the temperature of the reaction in process tube 30.

Figure 4:
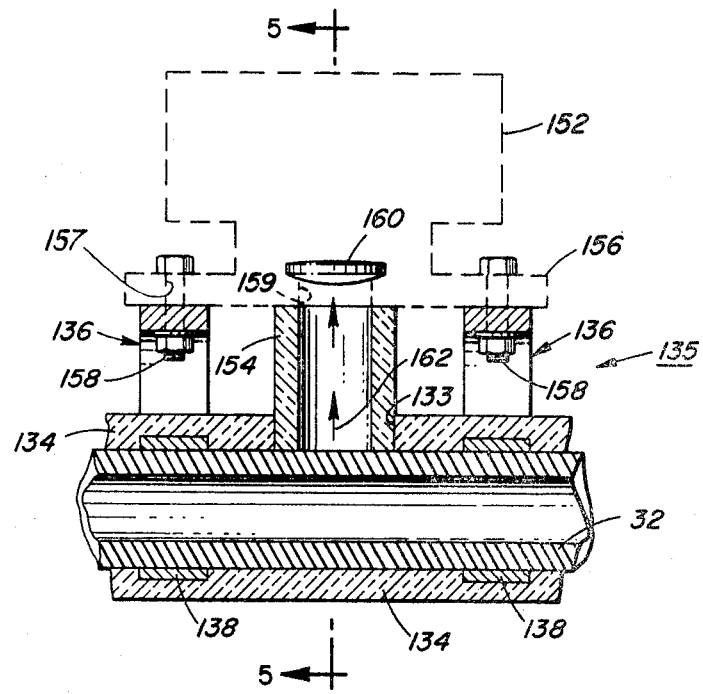
FIG. 4 is a front elevational view, partly in section of the temperature sensing apparatus designated as 111 in FIG. 1.
Figure 5:
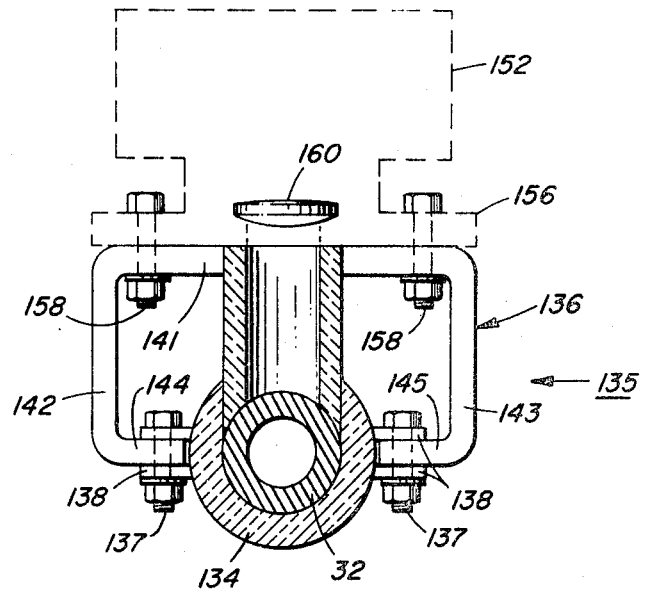
FIG. 5 is a cross-sectional view, through the plane 5—5 of FIG. 4.

Referring now to FIGS. 4 and 5, there can be seen a temperature sensing apparatus generally designed by the numeral 111 according to the present invention, in use to sense the temperature of a fluid in a pipe. This arrangement can be used for example, to sense the temperature in inlet pipe 32 or outlet pipe 42 of the process heater of FIG. 1.

The pyrometer 152 has a mounting flange 156 with bolt holes 157 therein and a central opening 159 coaxial with a focussing lens 160 for passing radiation to be sensed 162 therethrough. A frame for supporting pyrometer 152 on pipe 32, designated generally by numeral 135, comprises a pair of pipe straps 138 rigidly secured to pipe 32, each being secured, as by bolts 137, to a generally rectangular brace member 136. Each pipe strap 138 comprises an upper member and a lower member, each having a curved portion and aligned flat end portions. The end portions of the upper and lower members of strap 138 are sufficiently long to extend outwardly through insulation 134 on pipe 32 and are provided with holes for receiving bolts 137 therethrough. The curved central portions of the upper and lower members of strap 138 conform to the curve of the outer surface of pipe 32 and extend through an arc of less than 180° F. Thus, when the upper and lower members of strap 138 are positioned on pipe 32, their end portions are separated so as to provide a space for receiving the brace 136, therebetween. Each generally rectangular brace member 136 comprises an upper side 141, two side portions 142, 143 and inwardly extending lower portion 144, 145. The upper sides 141 are provided with holes 146 which are spaced for alignment with holes 157 in pyrometer mounting flange 156 for receiving bolts 158. The inwardly extending lower portions 144, 145 are received between the end portion of strap 138 and are provided with holes for receiving bolts 137 therethrough. The pyrometer supporting frame 135 is sufficiently rigid to preclude harmful vibration betweeen pipe 32 and the pyrometer 152, and further, is of sufficient strength to insure that when assembled, the sighting axis of the pyrometer is through the center-line of pipe 32 at all times. Additionally, it is to be recognized that strap 138 could be replaced by flanges secured directly to the pipe as a means for securing brace 136.

In order to avoid the introduction of environmental radiation into the pyrometer, a tube 154 is positioned to extend between the surface of pyrometer mounting flange 156 and the outer surface of pipe 32. The tube 154 is contoured at its pipe adjacent end to fit snugly against the surface of pipe 32 within a hole 133 provided in the insulation 134 of pipe 32. At its pyrometer adjacent end, tube 154 firmly abuts mounting flange 156 and is suitably secured thereto.

As can be seen in FIGS. 4 and 5, the tube 154 is coaxial with hole 159 in mounting flange 156 and the line of sight of the pyrometer 152. Further, the longitudinal axis of tube 154 extends through the longitudinal centerline of pipe 32. Thus, the radiation detecting means of the pyrometer is sighted directly at the surface of pipe 32 through hole 159 and tube 154. Radiation thus emitted from the surface of pipe 32 passes through tube 154, free from environmental radiation effects, through hole 159, through focusing lens 160 and into the radiation sensing device of the pyrometer 152. In that environmental radiation is excluded by this apparatus, the radiation sensed by the pyrometer is truly indicative of the temperature of pipe 32 which in turn is indicative of the temperautre of the fluid passing therethrough.

Where conditions permit, i.e., if welding is permitted on the external surface of a fluid carrying pipe, a sighting pipe may be provided which has one end welded to the fluid carrying pipe, and the other end provided with a flange for mounting the pyrometer. The sighting pipe will be appropriately insulated to preclude any influence of environmental heat on the sensed radiation. The operation of such an embodiment will be exactly the same as the aforedescribed. Thus, the pyrometer mounted on the sighting pipe flange will sight axially down the sighting tube to sense radiation emitting from the fluid carrying tube.

As is obvious to those skilled in the art, the above disclosed apparatus affords an excellent means for sensing high temperatures in ordinary or difficult environments. For example, in considering the process heater 10 of FIG. 1 as a steam reformer, a steam methane mixture is fed through process tubes 30 and subjected to extremely high temperatures in the range of 1,400–2,200° F. A nickel oxide catalyst within the tubes 30 catalyzes the steam reforming reaction resulting in the production of hydrogen together with some CO, $CO_2$ and other reaction products. By using temperature sensing apparatus 11, 111 according to the present invention, close temperature control can be accomplished with regard to the reactants, reaction and reaction products in that the measurements obtained are accurate notwithstanding the hostile environment, and the output of the measuring devices is suitable as an input to an automatic control means.

Obviously, numerous modifications and variations of the present invention are possible in the light of the above teachings. It is, therefore, to be understood that within the scope of the appended claims, the invention may be practiced otherwise than as specifically described therein.

What is claimed is:

1. In an apparatus containing an enclosed body and a material within the body, the improvement comprising:
   a pyrometer, including a focusing lens, mounted adjacent said body, an insulated hollow member, one end of said member being in firm abutting engagement with an exterior wall of said body, the focusing lens of the pyrometer being positioned at the other end of said hollow member whereby the pyrometer is sighted directly at said exterior wall of the body through the hollow member and the pyrometer senses the radiation from the body without sensing environmental radiation to indicate the temperature of material within the body.

2. The apparatus as defined in claim 1 wherein the pyrometer is positioned whereby the line of sight thereof is through the centerline of the body, the hollow member being coaxial with the line of sight.

3. In a heat exchanger having a top wall, a bottom wall and side walls defining a chamber therein, a tube mounted within the chamber for passing a first heat transfer medium in an indirect heat transfer relationship with a second heat transfer medium within the chamber, the improvement comprising:
   a pyrometer, including a focusing lens, mounted externally of said chamber; an insulated hollow member within the chamber, one end of said hollow member being in firm abutting engagement with the exterior wall of the tube, the other end of said hollow member being in firm abutting engagement with a wall of the chamber including an aperture whereby there is a direct line of sight between the exterior of the chamber and the tube through the hollow member, the focusing lens of the pyrometer being positioned at the aperture in the wall whereby the pyrometer is sighted directly at the exterior wall of the tube through the hollow member and the pyrometer senses the radiation from the tube without sensing environmental radiation to indicate the temperature of the first heat transfer medium within the tube.

4. The heat exchanger of claim 3 wherein a plurality of burners are mounted in the chamber to provide the second heat transfer fluid.

5. The heat exchanger of claim 4 wherein the pyrometer is positioned whereby the line of sight thereof is through the centerline of the tube, the hollow member and aperture being coaxial with the line of sight.

6. The heat exchanger of claim 4 and further comprising:
   a conduit means for withdrawing the first heat transfer medium from the tube, another pyrometer including a focusing lens, another insulated hollow member, one end of the another hollow member being in firm abutting engagement with an exterior wall of the conduit means, the focusing lens of the another pyrometer being positioned at the other end of the another hollow member whereby the pyrometer is sighted directly at said exterior wall of the conduit means through the another hollow member and the another pyrometer senses the radiation from the conduit means without sensing environmental radiation to indicate the temperature of the first heat transfer medium within the conduit means.

7. The heat exchanger as defined in claim 4 wherein the other end of the hollow member is in abutting engagement with a side wall of the chamber and the pyrometer is externally mounted on said side wall.

References Cited

UNITED STATES PATENTS 2,275,265  3/1942  Mead _____ 236—15
2,448,199  8/1948  Vollrath _____ 236—15

ROBERT A. O'LEARY, Primary Examiner

CHARLES SUKALO, Assistant Examiner

U.S. Cl. X.R.

165—32; 236—15